United States Patent
Gathoo

(10) Patent No.: US 7,984,434 B1
(45) Date of Patent: Jul. 19, 2011

(54) NONDESTRUCTIVE PATCHING MECHANISM

(75) Inventor: Yogesh Gathoo, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 1713 days.

(21) Appl. No.: 10/443,661

(22) Filed: May 21, 2003

(51) Int. Cl.
*G06F 9/44* (2006.01)

(52) U.S. Cl. ...................................................... 717/170

(58) Field of Classification Search .......... 717/168–178
See application file for complete search history.

(56) References Cited

U.S. PATENT DOCUMENTS

| | | | | |
|---|---|---|---|---|
| 5,287,511 A * | 2/1994 | Robinson et al. | ............. | 717/106 |
| 5,524,244 A * | 6/1996 | Robinson et al. | ............. | 717/140 |
| 6,135,651 A * | 10/2000 | Leinfelder et al. | ............. | 717/168 |
| 6,154,878 A * | 11/2000 | Saboff | ............. | 717/173 |
| 6,230,307 B1 * | 5/2001 | Davis et al. | ............. | 716/16 |
| 6,347,396 B1 * | 2/2002 | Gard et al. | ............. | 717/168 |
| 6,477,703 B1 * | 11/2002 | Smith et al. | ............. | 717/168 |
| 6,691,301 B2 * | 2/2004 | Bowen | ............. | 717/114 |
| 6,708,290 B2 * | 3/2004 | Swoboda et al. | ............. | 714/30 |
| 6,763,517 B2 * | 7/2004 | Hines | ............. | 717/124 |
| 6,832,373 B2 * | 12/2004 | O'Neill | ............. | 717/171 |
| 6,859,923 B2 * | 2/2005 | Taylor | ............. | 717/172 |
| 6,871,344 B2 * | 3/2005 | Grier et al. | ............. | 717/162 |
| 6,907,595 B2 * | 6/2005 | Curd et al. | ............. | 716/16 |
| 6,907,602 B2 * | 6/2005 | Tsai et al. | ............. | 717/168 |
| 6,938,243 B1 * | 8/2005 | Zeevi et al. | ............. | 717/124 |
| 6,941,538 B2 * | 9/2005 | Hwang et al. | ............. | 716/16 |
| 6,944,856 B2 * | 9/2005 | Taylor | ............. | 717/171 |
| 6,948,164 B2 * | 9/2005 | Tinker | ............. | 717/168 |
| 6,976,239 B1 * | 12/2005 | Allen et al. | ............. | 716/16 |
| 6,978,453 B2 * | 12/2005 | Rao et al. | ............. | 717/171 |
| 7,085,670 B2 * | 8/2006 | Odom et al. | ............. | 702/127 |
| 7,086,049 B2 * | 8/2006 | Goodman | ............. | 717/168 |
| 7,089,547 B2 * | 8/2006 | Goodman et al. | ............. | 717/168 |
| 7,089,550 B2 * | 8/2006 | Bakke et al. | ............. | 717/173 |
| 7,124,391 B1 * | 10/2006 | Patterson | ............. | 716/17 |
| 7,287,259 B2 * | 10/2007 | Grier et al. | ............. | 719/331 |
| 7,290,244 B2 * | 10/2007 | Peck et al. | ............. | 717/109 |
| 7,415,704 B2 * | 8/2008 | Schmidt et al. | ............. | 717/166 |
| 7,694,277 B2 * | 4/2010 | Yuknewicz et al. | ............. | 717/121 |
| 2003/0191870 A1 * | 10/2003 | Duggan | ............. | 709/331 |
| 2004/0003390 A1 * | 1/2004 | Canter et al. | ............. | 717/178 |

OTHER PUBLICATIONS

Address Assignment Combined with Scheduling in DSP Code Generation, Yoonseco Choi et al, ACM, Jun. 2002, pp. 225-230.*
Shared Virtual Memory with Automatic Update Support, Liviu Ifode et al, ACM, 1999, pp. 175-183.*
Smart Memories: A Modular Reconfigurable Architecture, Ken Mai et al, ACM , 2000.*
Re-Configurable Computing in Wireless, Bill Salefski et al, ACM, 2001 pp. 178-183.*

(Continued)

*Primary Examiner* — Lewis A Bullock, Jr.
*Assistant Examiner* — Jue Wang
(74) *Attorney, Agent, or Firm* — Weaver Austin Villeneuve & Sampson LLP

(57) ABSTRACT

Techniques and mechanisms are provided for patching software, such as software for implementing parameterizable processor cores and peripherals on a programmable chip. Software components constructed using various shared modules can be updated without affecting other components using the same shared modules. In one example, a software component includes a manifest for identifying the implementations that should be associated with the various modules. When a patched implementation is provided for a particular module, the component manifest is changed to associate the patched implementation with the component. The pre-patch implementation is preserved so that other components using the pre-patch implementation may be kept unchanged.

20 Claims, 12 Drawing Sheets

OTHER PUBLICATIONS

IBM Technical Disclosure Bulletin, vol. 31, No. 1, Jun. 1988, pp. 294-298.*

Product overview of "UpdateExpert™ Datasheet", stbernard.com 2 pages; downloaded on Feb. 1, 2005, 2 pages.

Pocket Soft, Inc., "RTPatch Platform Independent Technology Overview," retrieved from rtpatch.com/whitepapers/whitepaper.html 4 pages; downloaded on Feb. 1, 2005.

* cited by examiner

FIG. 5B

PRIOR ART

NONDESTRUCTIVE PATCHING MECHANISM

BACKGROUND OF THE INVENTION

1. Field of the Invention

The present invention relates to patching mechanisms. In one example, the present invention relates to methods and apparatus for updating software code for parameterizing cores and peripherals for implementation on a programmable chip.

2. Description of the Prior Art

A number of benefits have spurred efforts towards higher levels of system integration on a programmable chip. Integrating processors and peripherals on a single integrated circuit allows compact system size, low power requirements, durability, high-performance, and low unit costs. Programmable logic allows custom logic in an integrated circuit while avoiding time-consuming and expensive engineering processes associated with designing ASICs. Many programmable logic chips can be reconfigured with a new design relatively quickly.

Implementing a system on a programmable chip typically entails using an array of software tools during a significant portion of the design process. Software is typically used to provide mechanisms for a user to specify and customize designs of processor cores and peripherals. In many instances, various processor cores and peripherals are themselves described as code available from a library. Conventional software tools allow an integrated system to be implemented effectively on a programmable chip. However, mechanisms for changing or updating the various software tools are limited. Conventional mechanisms for updating software for implementing programmable chips as well as for updating software in general are limited. Simple patching of source, object, or executable files have significant drawbacks. The drawbacks apply not only to software for implement programmable chips, but to software in general.

To improve the ease of updating software, efforts have been made to modularize various software applications. Theoretically, increased use of modularity improves the ability to change various software modules without affecting other modules or other applications using the updated modules. However, despite extended efforts to provide true modularization, updates to a module often have adverse affects.

Consequently, it is therefore desirable to provide improved methods and apparatus for updating software in general. More specifically, it is desirable to provide improved techniques and mechanisms for updating software for parameterizing cores and peripherals for implementation on programmable chips.

SUMMARY OF THE INVENTION

Methods and apparatus are provided for patching software, such as software for implementing parameterizable processor cores and peripherals on a programmable chip. Software components constructed using various shared modules can be updated without affecting other components using the same shared modules. In one example, a software component includes a manifest identifying the implementations that should be associated with the various modules. When a patched implementation is provided for a particular module, the component manifest is changed to use the patched implementation. The pre-patch implementation is preserved so that components with pre-patch manifests can still be kept unchanged.

In one embodiment, a method for incorporating a software patch is provided. The application environment is run to allow the customization of a plurality of components for implementation on a programmable chip. The plurality of components include a plurality of shared software modules. Each shared software module is associated with a pre-patch implementation. A shared software module used by a component is identified. The shared software module used by the component is reassociated with a patched implementation. The shared software module remains associated with the pre-patch implementation when the shared software module is used by other components.

In another embodiment, a component is provided. The component includes a plurality of modules, a plurality of implementations, and a component manifest. The plurality of modules is used by the component and other components running on an application environment. The plurality of implementations is associable with the plurality of modules. The component manifest is associated with the component. The component manifest associates particular modules of the plurality of modules with particular implementations of the plurality of implementations.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media. Still other aspects relate to systems including a processor and memory for implementing a method as described above. Any of the method or techniques of this invention may be implemented on a system having a processor and memory.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIGS. 5A-5C are examples of wizards associated with a component that can be used to configure a component for implementation on a programmable chip.

DETAILED DESCRIPTION OF SPECIFIC EMBODIMENTS

Figure 1:
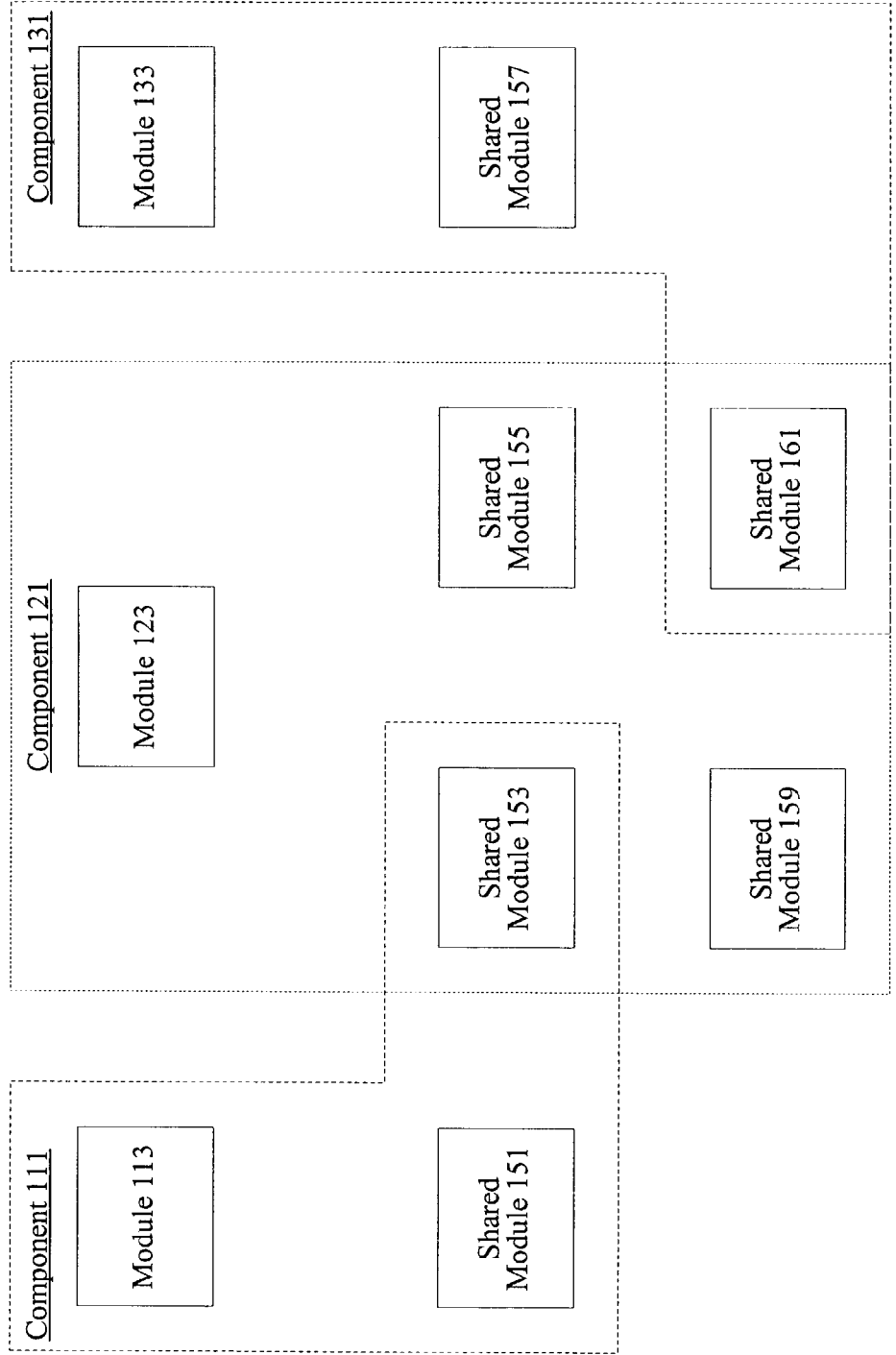
FIG. 1 is diagrammatic representation showing software components using shared modules.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

A variety of mechanisms are available for debugging, improving, or updating software programs. In conventional systems, an outdated or defective software application can be updated with a newer version of the software application. The newer versions may provide bug fixes or an improved feature set over the prior version. However, providing an entirely new version of the software is often not practical. Developing and testing the new version of software may take large amount of time and the new software may not be easily distributable to users of the application. Consequently, patches often have been used to replace faulty portions of software or to add limited feature sets.

In some examples, patches are provided to replace source files available to user. The source files are then recompiled into an updated of the software program. Similarly, patches can be provided to replace object code or intermediate code that the user then links into an executable. In some examples, patches replace bits or bit sequences in executable files or in files associated with executable files in order to update the software.

With increasingly complex software, efforts have been made to modularize various software applications, utilities, and tools so that updates and changes can be made to various modules without affecting the functionality of other modules. In one example, a software development program can include an application specific module, a module to display a graphical user interface, and a module to read data from a database. When an update needs to be made to the graphical user interface, the module to display the graphical user interface can theoretically be modified without affecting the other modules in the software development program. The modularity concept has been extended to multiple applications, tools, and utilities to allow different software programs to share underlying modules.

For example, a bus tool used to customize a peripheral components interface core on programmable chip and a memory tool used to customize a memory module on a programmable chip may both use the same module to display graphical user interfaces. If a user finds a defect in the shared graphical user interface module for a bus tool, a developer can provide a new shared module to display the graphical user interface. Alternatively, the developer can provide a patch to the shared module to display the graphical user interface.

Again, theoretically, the update to shared module will not affect the operation of other modules used by the bus tool or adversely affect other modules used by other applications such as the memory tool.

However, despite extended efforts to provide true modularization, patches to a module often affect other modules and the applications using that updated module in unexpected ways. For example, a bus tool bug fix for a shared graphical user interface module may not only affect other modules used by the bus tool but often adversely affects a memory tool using the same graphical user interface module. Consequently, extensive testing is often needed not only to insure that an updated shared module works to fix a defect in a particular application, but extensive testing is also often needed to insure that the updated shared module does not detrimentally affect other applications using that shared module. Running this extensive testing is often not possible because the universe of applications using that shared module is typically not known. Furthermore, even if exhaustive testing is possible, testing takes resources and time that are often not available when a minor defect associated with a particular application needs to be fixed.

Consequently the techniques of the present invention provide efficient mechanisms for changing various modules or providing new versions of various modules while preserving prior module versions. Various software programs using such modules can be dynamically associated with particular versions or implementations of those modules. For example, an update to a shared module for displaying a graphical user interface may be applied to only a bus tool while a memory tool continues to use the prior version or implementation of the shared module. Similarly, if a patch to a module affects an application in an undesirable way, a user can roll back to a prior version or implementation of the module. Mechanisms of the present invention maintain the availability of shared modules while providing application specific updates and patches. The user can apply the updates and patches associated with a shared module to only a specific application or may apply the updates to multiple applications.

FIG. 1 is a diagrammatic representation showing various software components using shared modules. Any piece of software that is user accessible is referred to herein as a component. In some examples, components are applications, utilities, tools, applets, or programs that a user can manipulate to perform a specific task. In other examples, components are database programs, debugging tools, compilers, encryption utilities, graphics viewers, or word processing programs. Components such as component 111, 121, and 131 are run on an application environment.

Any platform that provides program interfaces for the running of components is referred to as an application environment. In one example, an application environment is an operating system and components 111, 121, and 131 are database and spreadsheet programs running on top of the operating system. In another example, the application environment is an Internet browser that supports various components such as graphics viewers and media players. In yet another example, the application environment is a development platform that allows running of the components such as development tools for customizing or parameterizing DSP cores, bus cores, and memory cores for implementation on a programmable chip. In each of these examples, the components can be written using various modules including component specific modules 113, 123, and 133 along with shared modules 151, 153, 155, 157, 159, and 161.

Any unit of software used only by a particular component is referred to herein as a component specific module. In some examples, component specific modules provide code for generating a netlist for implementing a particular DSP core or calculating a Fourier transform. Any unit of software that is provided for use by potentially more than one component is referred to herein as a shared module. In some examples, shared modules provide code for reading particular types of files, displaying output on a monitor in a particular format, converting display output into a printer readable format, or writing data to a database. Each of these modules serves functions that may potentially be used by more than one component.

In some instances, component specific modules may become shared modules. According to various embodiments, a shared module 153 is used by both component 111 and component 121. Shared module 161 is used by both component 121 and component 131. Shared modules 151, 155, 157, and 159 are currently only used by a single component but may be used by other components installed in the application environment. It should be noted that an application environment may also itself be implemented using a variety of modules.

Figure 2:
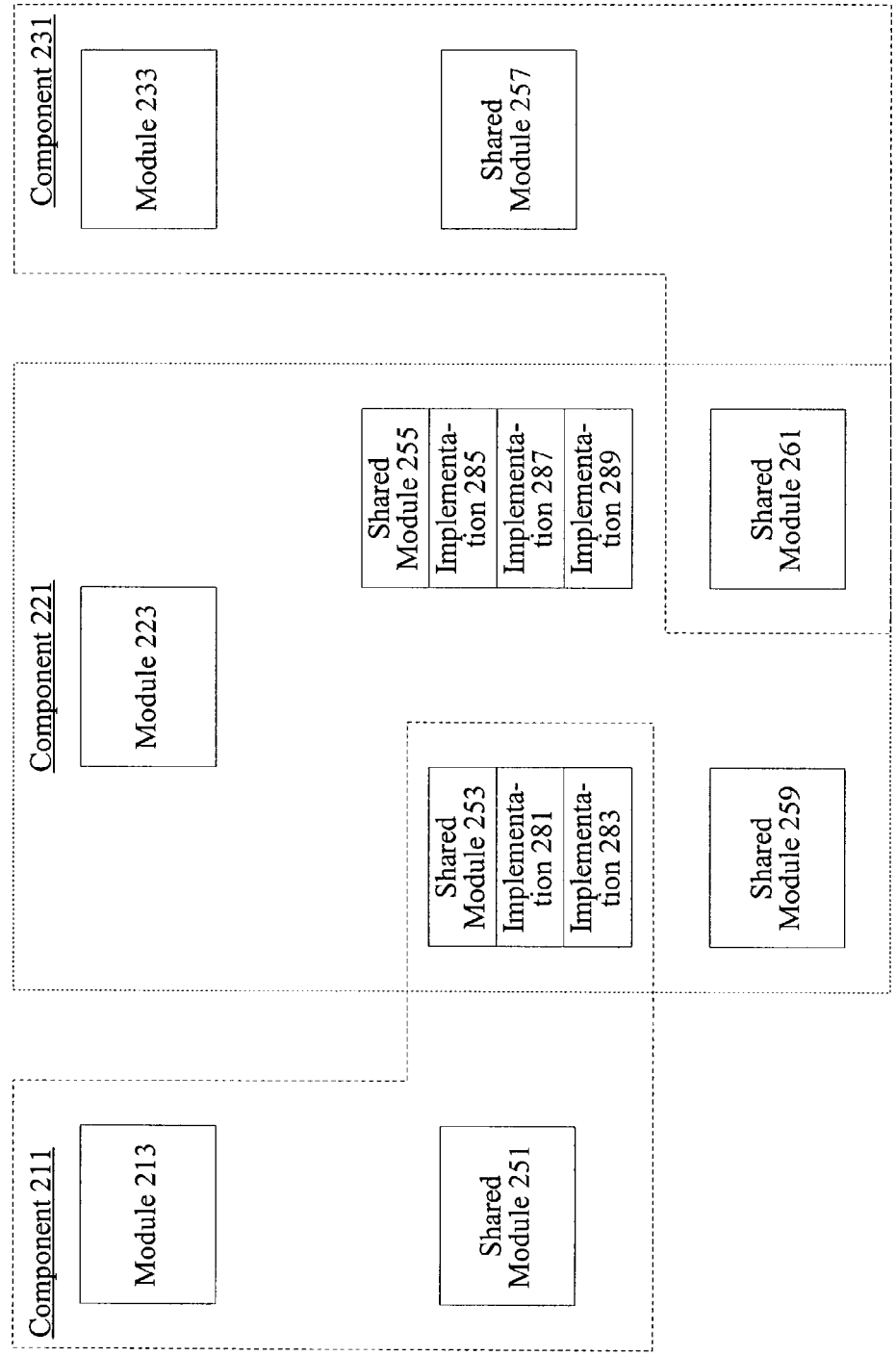
FIG. 2 is a diagrammatic representation showing software components using shared modules associated with various implementations.

FIG. 2 is a diagrammatic representation showing various software components that use shared modules having multiple implementations or versions. Components 211, 221, and 231 are running on an application environment and include component specific modules 213, 223, and 233 as well as shared modules 251, 253, 255, 257, 259, and 261. Shared module 253 is used by both components 211 and 221. Shared module 261 is used by both components 221 and 231. According to various embodiments, techniques of the present invention provide mechanisms for allowing shared modules to be associated with multiple implementations. A version of the shared module or a portion of a shared module is referred to herein as an implementation of the shared module. In some examples, implementation 283 is a patched version of the shared module 253. The pre-patch version of the shared module 253 is represented by implementation 281.

The techniques of the present invention also allow for multiple versions to co-exist. In one example, the shared module 255 has an original implementation 285, a second implementation 287, and a third implementation 289. By providing multiple implementations of a shared module and associating the different implementations with the various components that use the shared module, the techniques of the present invention provide mechanisms for updating or patching a shared module for a particular component while leaving the other components unaffected. For example, component 211 may be a tool for parameterizing a DSP core. The tool uses a shared module 253 for displaying various windows on an application environment. However, the tool for parameterizing a DSP core may need a horizontal scroll bar locking mechanism that is not provided by a shared module 253 in implementation 281.

Consequently, a patched or updated version of the shared module 253 is provided as implementation 283. Implementation 283 is then associated with component 211. Other components such as component 221 and 231 continue to be associated with pre-patch implementation 281. Components 211 consequently can use the horizontal scroll bar locking mechanism provided in shared module 253. Components 221 and components 231 continue to use the shared module 253 with implementation 281 without the horizontal scroll bar locking mechanism. The ability to add an implementation for a shared module and associate it with a particular component allows modification of a shared module for updating the particular component without affecting other components. In some examples, a horizontal scroll bar locking mechanism could adversely affect the behavior of components 221 and 231.

Figure 3:
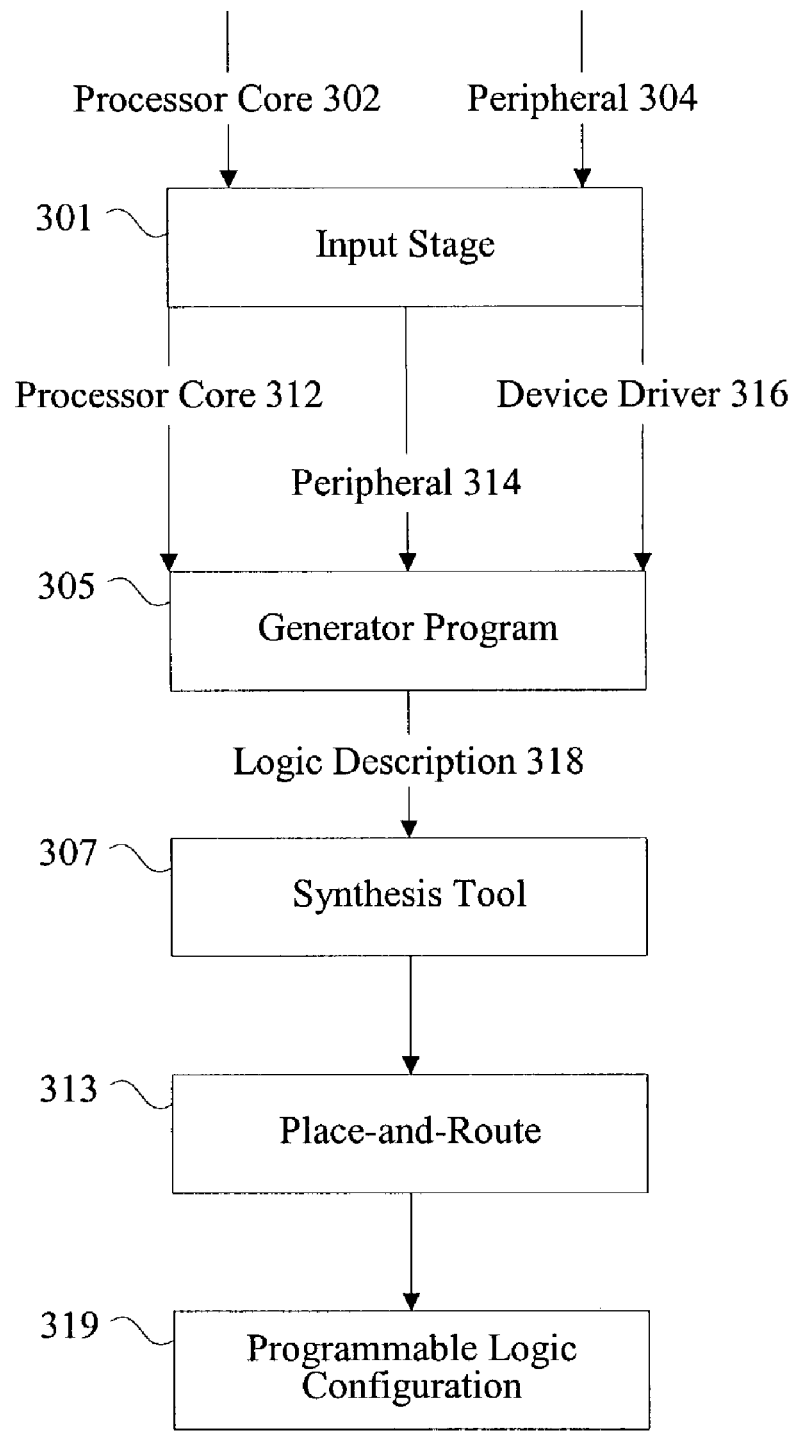
FIG. 3 is a diagrammatic representation depicting a system that can use the techniques of the present invention.

FIG. 3 is a diagrammatic representation showing one context that can use the techniques of the present invention. Although the techniques of the present invention will be described in the context of tools for customizing components for implementation on a programmable chip, it should be noted that the techniques of the present invention can be applied to a variety of contexts. For example, instead of updating a DSP tool component with modules for writing parameters to a file, a word processing program with a shared library such as a DLL (Dynamically Linked Library) module for reading rich text format files may be updated. Similarly, a media player component with a shared module for outputting audio files may be modified. According to various embodiments, methods and apparatus are provided for making non-destructive modification of various modules used to implement components on programmable chips.

An application environment such as an input stage 301 is provided to allow a user to select and parameterize components for a programmable chip. Some examples of components are processor cores such as a RISC processor core, peripheral interfaces such as an interface to external memory, and peripheral components such as a timer or universal asynchronous receiver transmitter (UART). Processor core, peripherals, and other components can all be interconnected on the programmable chip. The components can also be connected with on-chip or off-chip components.

An application environment provides a platform to run tools to allow selection and parameterization of components. In one example, the application environment is IP Toolbench (an IP Software development platform) available from Altera Corporation of San Jose, Calif. and the various tools are component and the associated component wizards. Any tool used to customize a component for implementation on a programmable chip is referred to herein as a wizard. According to various embodiments, each component has an associated wizard. A processor core component 302 includes a wizard for displaying windows for parameterizing the processor core for implementation on the programmable chip. A peripheral component 304 includes a wizard for receiving parameter information on a peripheral. Each component may use component specific modules and shared modules for receiving and storing data. Configuring a programmable chip with a particular logic description or downloading a logic description onto a programmable chip is referred to herein as implementing a programmable chip. Some examples of programmable chips that can be implemented using the techniques of the present invention are programmable logic devices, complex programmable logic devices, programmable logic arrays, programmable array logic devices, and field-programmable gate arrays.

A generator program creates a logic description of the various modules using processor core information 312, peripheral information 314, and device driver information 316 also associated with various components. The processor core information 312, peripheral information 314, and device driver information 316 may all be provided to the generator program using the same module shared by various components. In one example, a user may discover a flaw in the way processor core information 312 is provided to the generator program 305. A patch would typically be applied to the shared module for sending information to the generator program. However, the patch may adversely affect the way peripheral information 314 and device driver information 316 are sent. According to various embodiments, the techniques of the present invention provide component specific patches applied to shared modules that allow a processor core to use a particular implementation of the shared module while a peripheral uses a pre-patch implementation.

With the processor core information 312 and the peripheral information 314 provided accurately, the generator program 305 can then output a logic description 318. The logic description 318 is then passed to a variety of synthesis tools, place and route programs 313, and programmable logic configuration tools 319 to allow a logic description to be downloaded onto the programmable chip.

According to various embodiments, the generator program 303 is a Perl script creating HDL files such as Verilog, Abel, VHDL, and AHDL files from the parameter information entered by a user. In some embodiments, the generator program 303 also provides information to a synthesis tool 307 to allow HDL files to be automatically synthesized. Some of the available synthesis tools are Leonardo Spectrum, available from Mentor Graphics Corporation of Wilsonville, Oreg. and Synplify available from Synplicity Corporation of Sunnyvale, Calif.

According to various embodiments, the place and route tool 313 and the programmable logic configuration stage 319 are provided in the Quartus Development Tool, available from Altera Corporation of San Jose, Calif. As will be appreciated by one of skill in the art, a variety of synthesis, place and route, and programmable logic configuration tools can be used to implement various techniques of the present invention.

Figure 4:
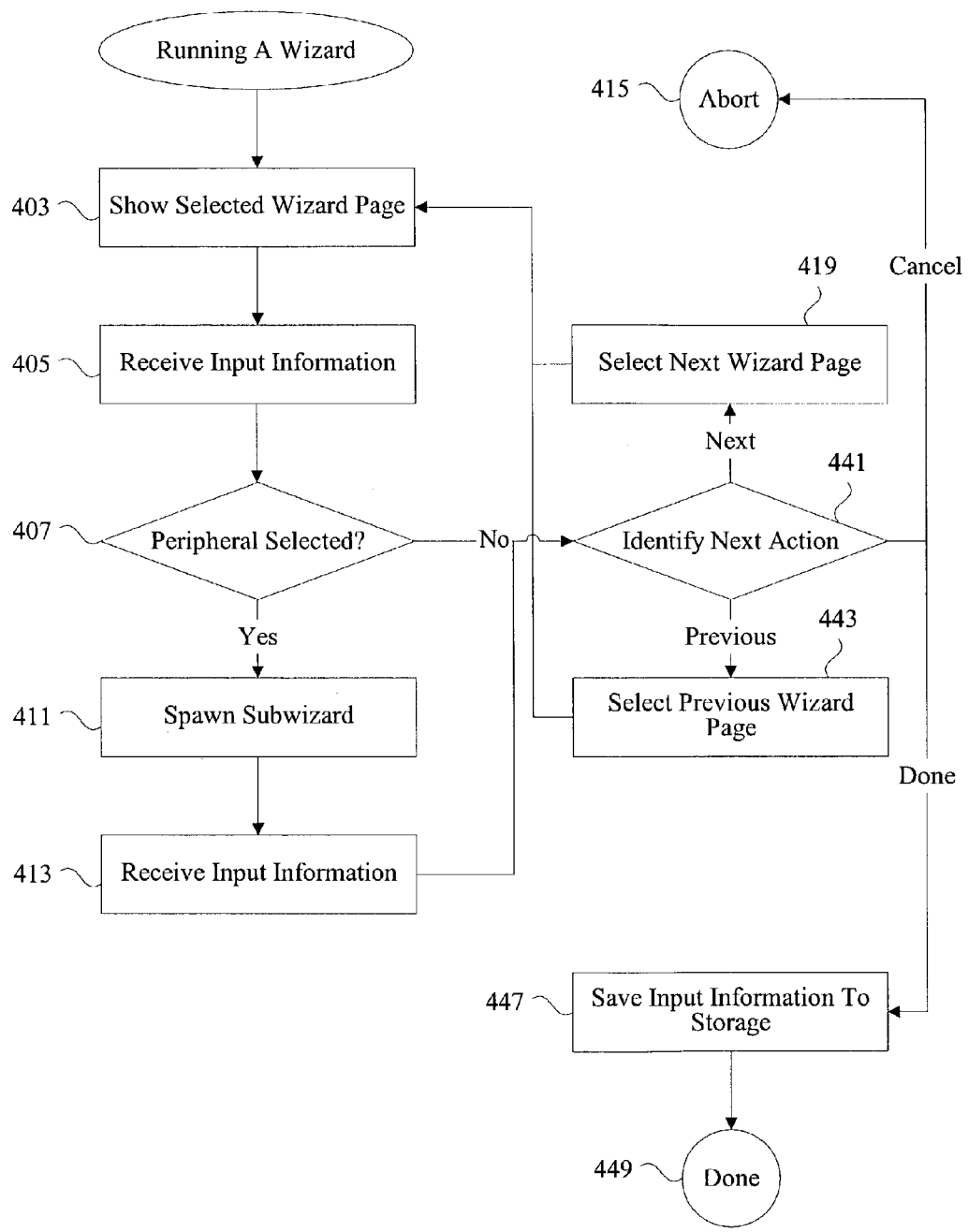
FIG. 4 is a flow process diagram showing the running of a component in an application environment.

FIG. 4 is a process flow diagram showing a wizard associated with a component that uses shared modules. Wizards generally include a sequence of pages. Each page can present the user with content information and questions. Each page may also include input mechanisms such as check boxes, radio button groups, drop-down selection lists, or entry spaces. Each wizard page may include standard navigation buttons to allow a user to select a next page, a previous page, finish, or abort the wizard entirely.

At 403, a selected wizard page is shown to a user. At 405, a wizard may receive input information from a user who has selected various items on drop-down lists or marked various check boxes. The information can be used to later generate a logic description for implementing a programmable chip. Some of the items that the user may select are peripheral components and peripheral interfaces. For example, a user may select to implement a UART component and an SRAM interface. According to various embodiments, if a peripheral such as a peripheral component or a peripheral interface is selected at 407, a subwizard is spawned at 411. A subwizard can be another sequence of pages containing content, queries, and input mechanisms. A subwizard can be similar to a wizard. Each page of a subwizard can allow a user to enter parameters associated with a selected peripheral such as a UART.

In one example, a user selects a UART on a wizard page. The wizard then spawns a subwizard at 413 to accept parameter information for the UART. A shared module may be used by a variety of components to accept parameter information. According to various embodiments, a subwizard is a separate window from the window used to show the wizard. A sequence of subwizard pages can then be viewed by a user to allow parameterization of the UART. According to various embodiments, sub-wizards can themselves spawn other sub-wizards. Wizards and sub-wizards can be arranged to allow efficient and convenient entry of user selections and parameters. According to other embodiments, a subwizard is not spawned when a peripheral is selected. The selection of a peripheral may instead simply add the selected parameterized peripheral to the design. A variety of shared modules may provide logic for displaying wizards and sub-wizards.

If a wizard is not selected, a user action is identified at 421. The user may select a next page for viewing at 419, return to a prior page at 423, exit the wizard at 415, or selected finish. If the user selects finish, the information input by the user can be saved to storage at 427. According to various embodiments, the user input is saved to an ASCII based file such as a PTF file.

Figure 5A:
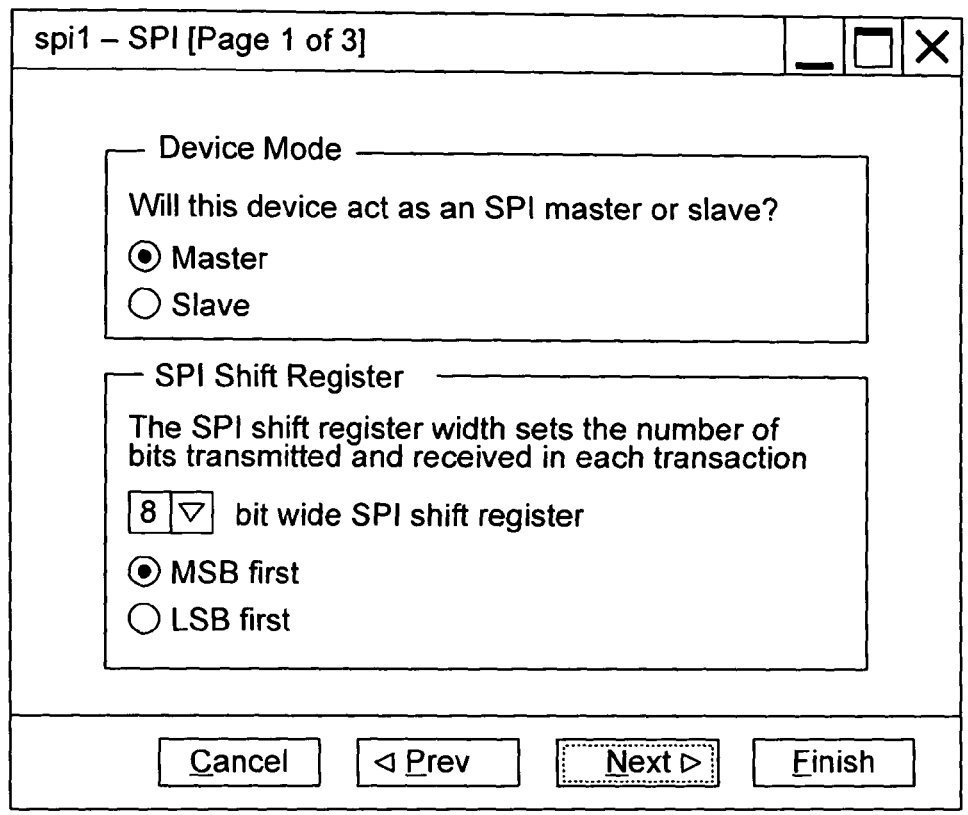
Figure 5B:
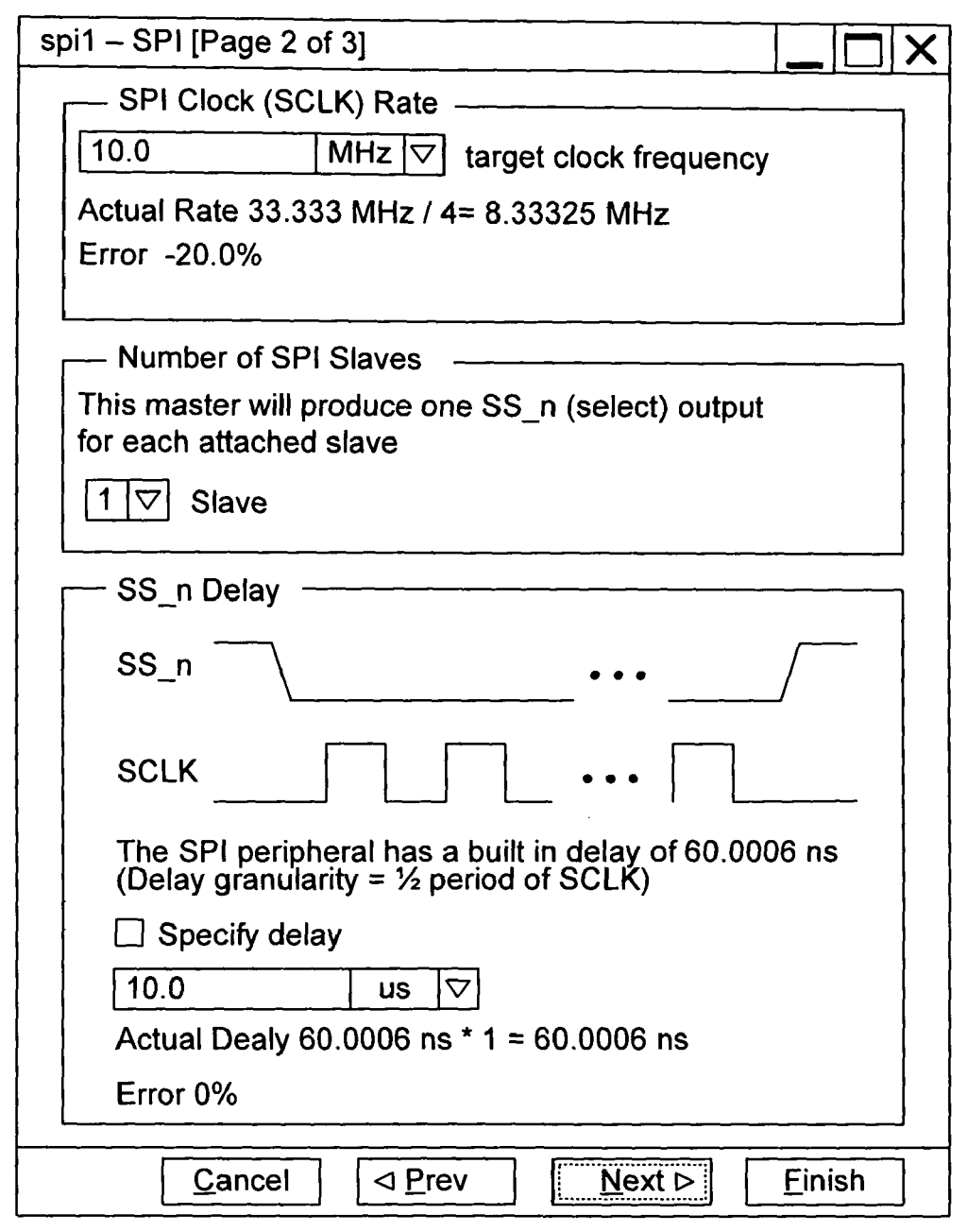
Figure 5C:
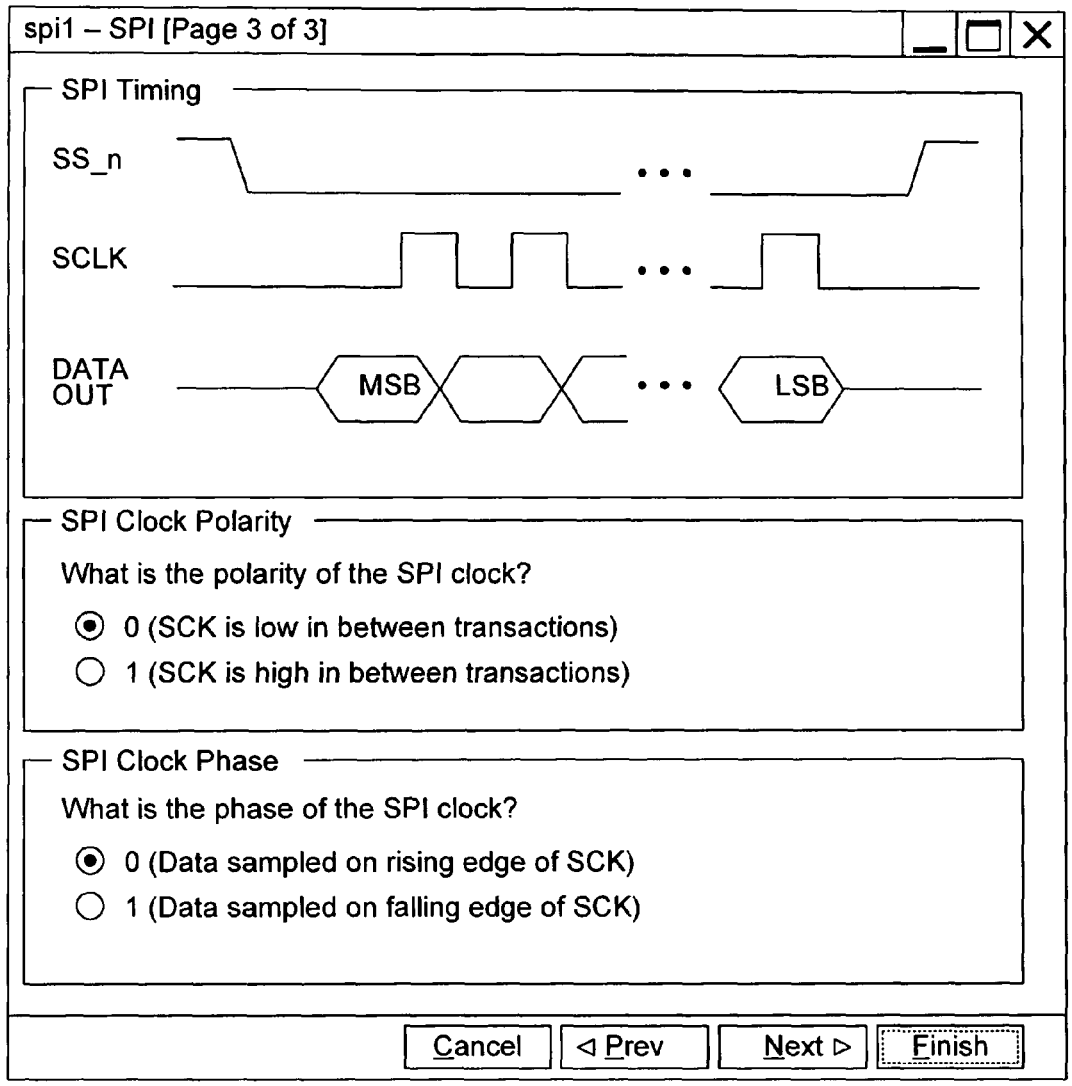

FIGS. 5A-5C show examples of wizards associated with a serial peripheral interface (SPI) component that is provided using modules and shared modules. In one example, different modules associated with the SPI component perform different functions. A user data interface module may provide the functionality for displaying a wizard for selecting SPI parameters. A symbol module may provide functionality for displaying a symbolic netlist based on saved parameters and customization information. A documentation module may provide functionality for linking the module with appropriate files describing the component such files can be user guides, application notes or white papers etc. A variety of different modules may be used. In one example, a user data interface module provides functionality that displays wizards as shown in FIGS. 5A-5C.

The user data interface module is typically shared by multiple components, such as universal asynchronous receiver transmitter (UART) components, parallel I/O (PIO) components, and memory interfaces that all display wizards for a user to enter parameters. If a defect is discovered in the user data interface module of the SPI component, a change can be made to the shared user data interface module component. However, the change may adversely affect other components. FIG. 5C provides an entry for selecting the number of SPI slaves. An SPI component may also need customized SS_n outputs for a table of selected attached slaves. Providing a table of selected attached slaves may not be supported by the shared user data interface module. A patch to provide table functionality may be added, but this functionality may adversely affect other components. Consequently, the techniques of the present invention provide mechanisms for applying the patch only to a particular component even though the patch is applied to a shared module.

Figure 6:
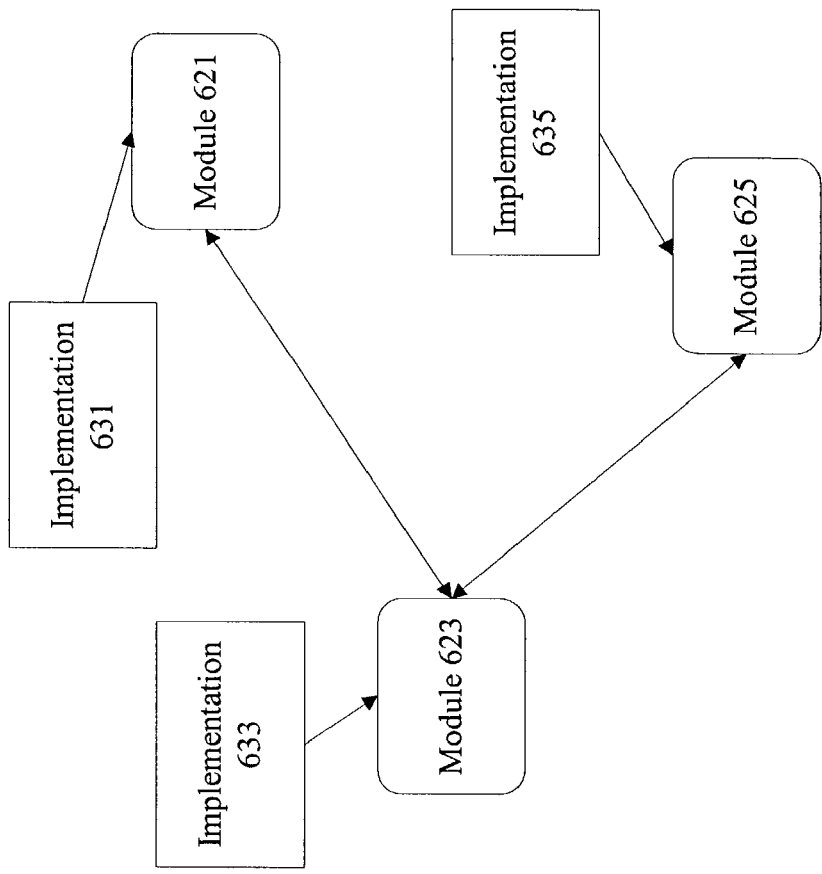
FIG. 6 is a diagrammatic representation showing a pre-patch manifest associated with a component.

FIG. 6 is a diagrammatic representation showing one mechanism for associating modules with particular implementations. According to various embodiments, a manifest such as manifest 611 is associated with each component. Any mechanism for identifying implementations that correspond with particular modules used by a component is referred to herein as a manifest. In one example, a pre-patch manifest 611 indicates that modules 621, 623, and 625 use implementations 631, 633, and 635. Module 621 may include functionality for generating a netlist. Module 623 may include functionality for receiving parameter information from a user. The implementation associated with module describes the way in which the described functionality is implemented. A manifest such as pre-patch manifest 611 is included in each component in a system. In one example, an application environment operable to run the various components also includes a manifest.

Figure 7:
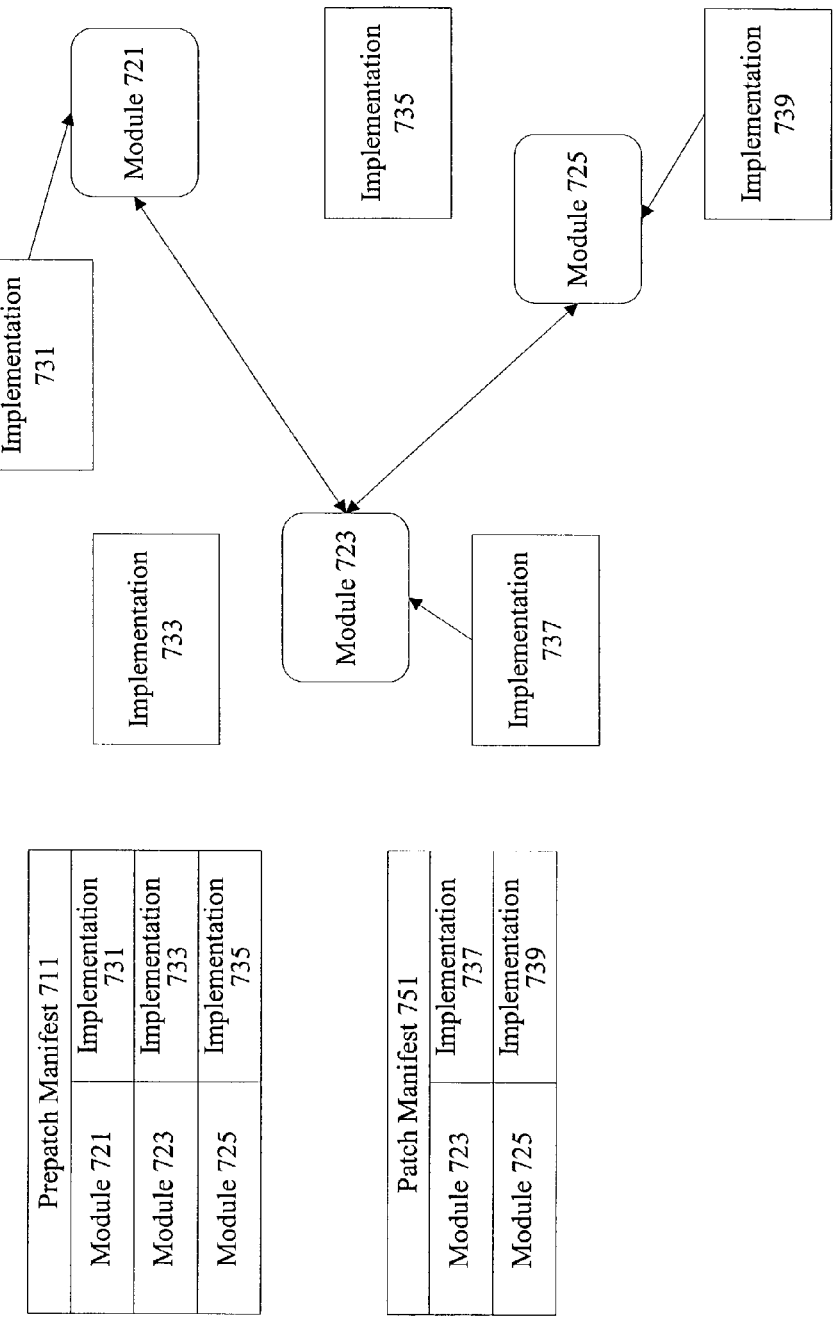
FIG. 7 is a diagrammatic representation showing a patch manifest associated with a component.

FIG. 7 is a diagrammatic representation showing a pre-patch manifest as well as a patch manifest. According to various embodiments, the pre-patch manifest 711 identifies modules 721, 723, and 725 that correspond with implementations 731, 733, and 735. If defects are found in module 723 and 725, a new patch manifest 751 along with new implementations 737 and 739 may be provided for a particular component. In one example, a DSP component uses modules 723 and 725 that require updating. The implementation 737 and 739 are provided and a patch manifest is associated with a DSP component. The patch manifest 751 indicates that module 723 and 725 should no longer be associated with implementations 733 and 735, but should instead be associated with implementations 737 and 739. When a component is run on an application environment, all the manifests associated with component can be read. By preserving the pre-patch manifest and implementations, other components running on the application environment can continue to use pre-patch implementations. Similarly, the component updated with a patch manifest can rollback to a prior version by simply reading only the pre-patch manifest.

Figure 8:
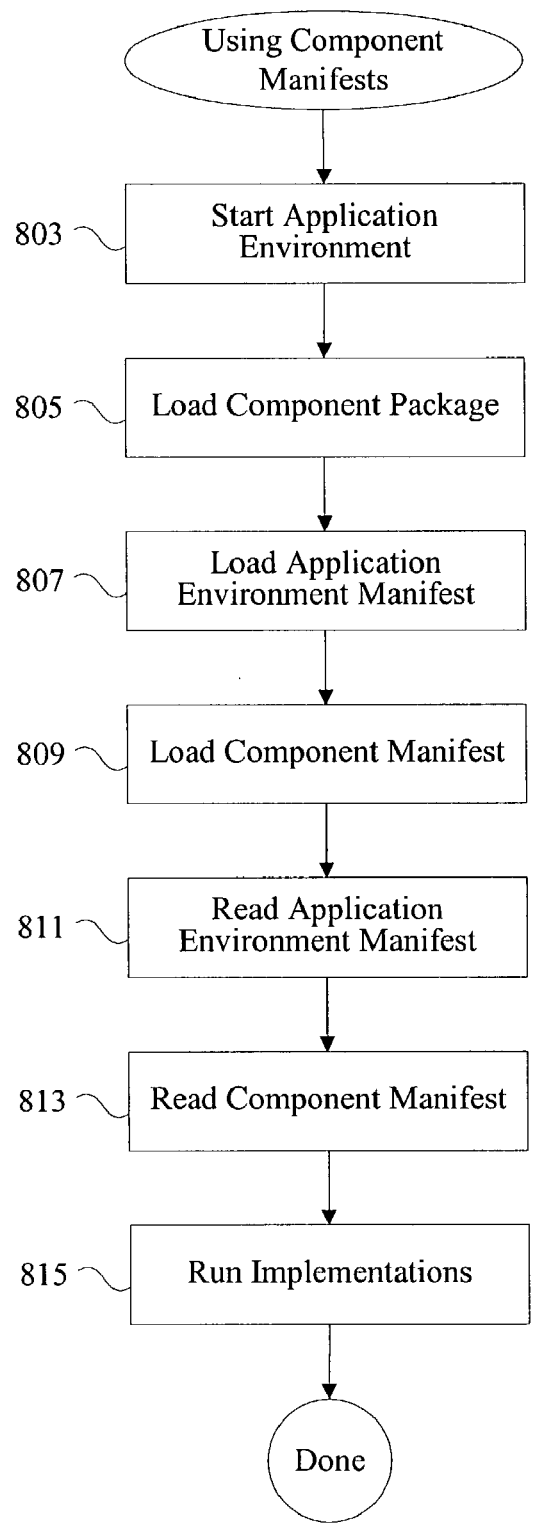
FIG. 8 is a flow process diagram depicting the use of component manifests.

FIG. 8 is a flow process diagram showing one technique for using component manifests. At 803, an application environment started. In one example, application environment is a development platform on which wizards for parameterizing various processor cores and peripherals are run. At 805, a component package is loaded. In many instances, a user will select a component package in the application environment or a component package can be pre-selected. In one example, a component package is software that includes modules for displaying wizards for selecting UART parameters, a module for displaying a UART netlist, and a module for linking files associated with the component. At 807, the application environment manifest is loaded.

At 809, the component manifest is loaded. According to various embodiments, loading a component manifest can include loading both an original manifest as well as subsequent versions of the manifest. At 811, the application environment manifest is read. At 813, the component manifest is read. Version information can be identified in order to determine how much of a component manifest to read. If a patch manifest is deemed to adversely impact system operation, a rollback version can be used so that only an original manifest, for example, may be read. In some cases, older manifests are read first. Subsequent manifests are read afterwards and can serve to override implementations associated with the various modules. At 815, the implementations identified in the various manifests are run. It should be noted that the techniques described do not necessarily have to be performed in a particular order and are not limited to components and patches. For example, in one instance an application environment manifest is loaded before a component package is loaded.

Figure 9:
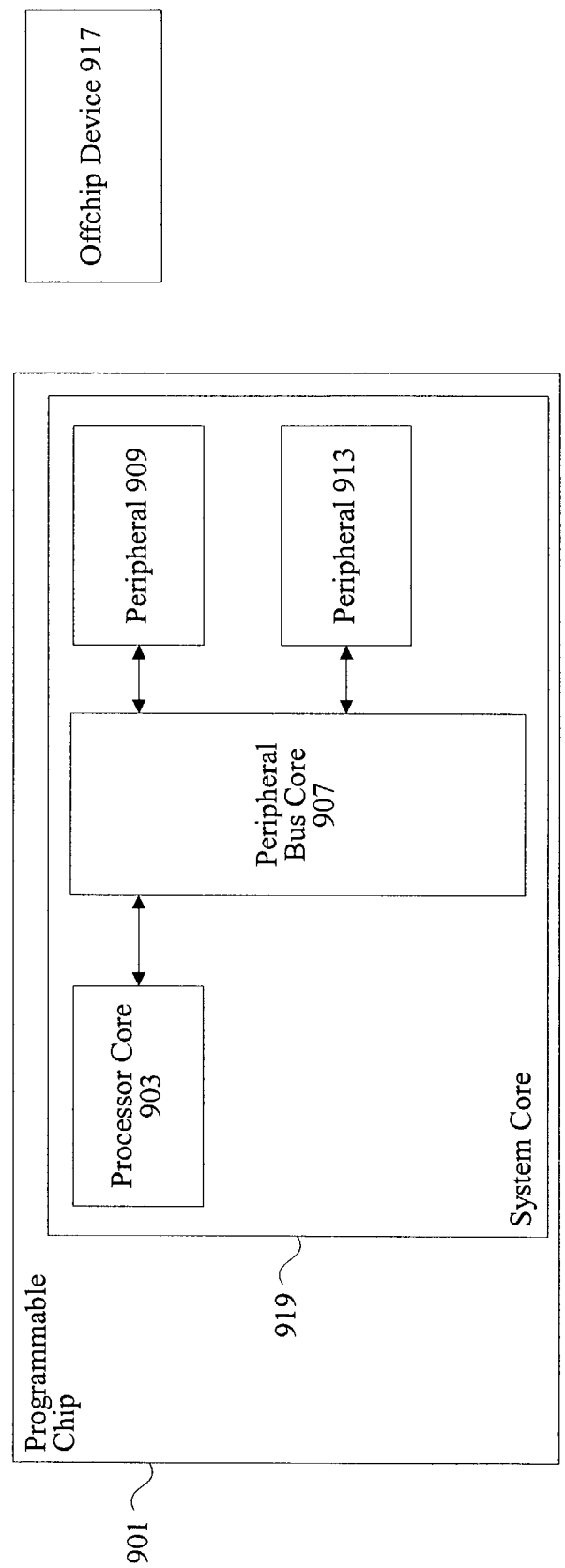
FIG. 9 is a diagrammatic representation showing a programmable chip that can be implemented using the techniques of the present invention.

FIG. 9 is a diagrammatic representation of a programmable chip containing components implemented using the various manifests. Any device including programmable logic is referred to herein as a programmable chip. A programmable chip 901 contains logic for system core 919 along with logic elements (LEs). In one example, system core 919 contains a dynamically generated peripheral bus 907. The dynamically generated peripheral bus 907 allows interconnections between processor core 903 and peripherals 909 and 913. System core 919 allows interconnections between a peripheral 913 and off-chip devices 917. System core 919 defines various interfaces to allow processor core 903, peripheral bus 907, peripheral 909, and peripheral 913 to connect to off-chip devices as well as other logic on the programmable chip 901. A variety of software tools can be used to implement programmable chip 901.

Figure 10:
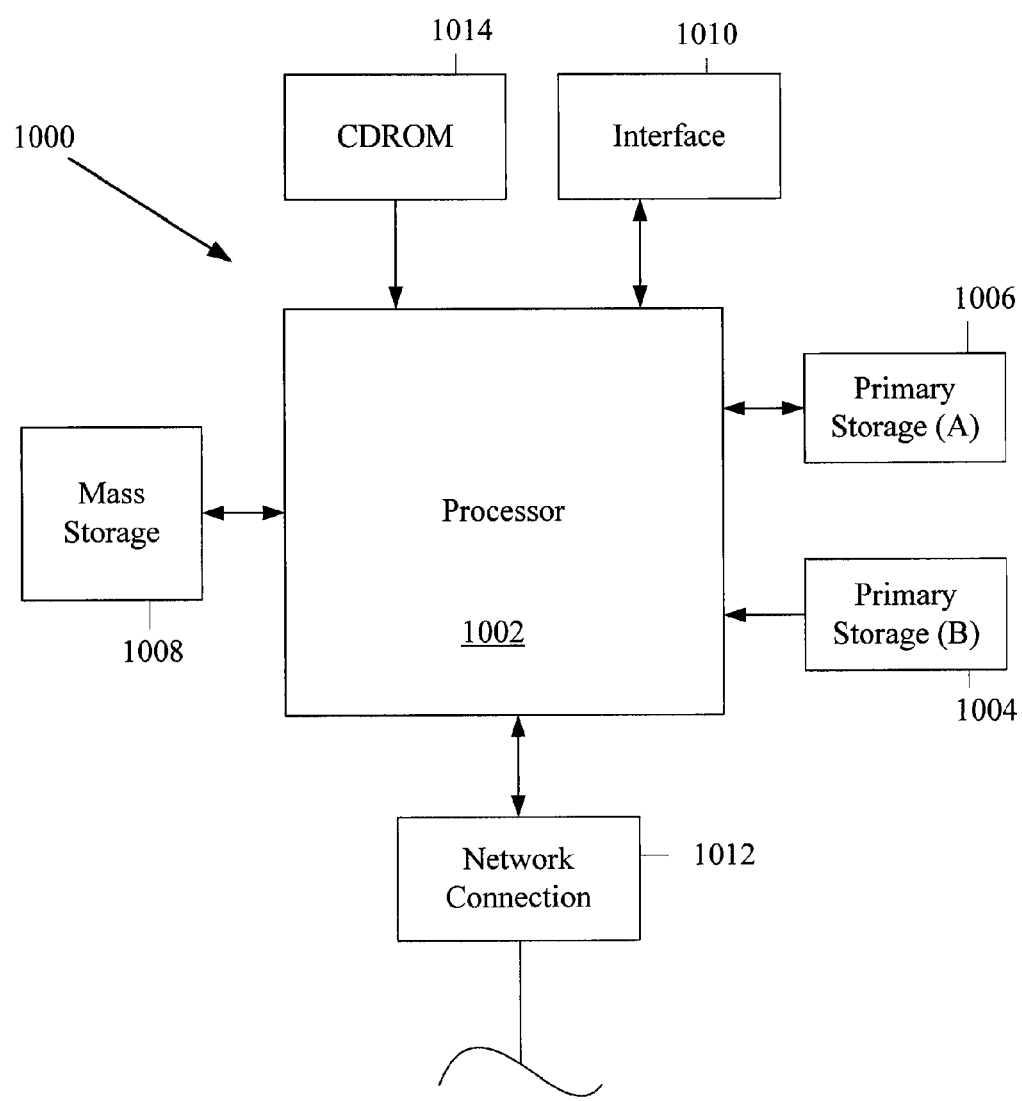
FIG. 10 is a diagrammatic representation showing a computer system that can implement programmable chips using patched components.

FIG. 10 illustrates a typical computer system that can run the application environment and the various component wizards. The computer system 1000 includes any number of processors 1002 (also referred to as central processing units, or CPUs) that are coupled to storage devices including primary storage 1006 (typically a random access memory, or "RAM"), primary storage 1004 (typically a read only memory, or "ROM"). The processors 1002 can be configured to receive selections and parameters from a user to dynamically generate a logic description. The primary storage 1006 can be used to hold a library or database of components, as well as information on various component specific and shared modules. As is well known in the art, primary storage 1004 acts to transfer data and instructions uni-directionally to the CPU and primary storage 1006 is used typically to transfer data and instructions in a bi-directional manner. Both of these primary storage devices may include any suitable type of the computer-readable media described above. Primary storage devices can also be used to hold parameter information received by various shared modules for the components being customized.

A mass storage device 1008 is also coupled bi-directionally to CPU 1002 and provides additional data storage capacity and may include any of the computer-readable media described above. The mass storage device 1008 may be used to store programs, data and the like and is typically a secondary storage medium such as a hard disk that is slower than primary storage. It will be appreciated that the information retained within the mass storage device 1008, may, in appropriate cases, be incorporated in standard fashion as part of primary storage 1006 as virtual memory. A specific mass storage device such as a CD-ROM 1014 may also pass data uni-directionally to the CPU.

CPU 1002 is also coupled to an interface 1010 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Video monitors can be used to display component wizards and sub-wizards to a user. Finally, CPU 1002 optionally may be coupled to a computer or telecommunications network using a network connection as shown generally at 1012. With such a network connection, it is contemplated that the CPU might receive information from the network, or might output information to the network in the course of performing the above-described method steps. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1008 or 1014 and executed on CPU 1008 in conjunction with primary memory 1006.

Although many of the components and processes are described above in the singular for convenience, it will be appreciated by one of skill in the art that multiple components and repeated processes can also be used to practice the techniques of the present invention. For example, a component noted above is described as having a pre-patch manifest. It should be noted, however, that a component can have multiple manifests associating modules different classes of implementations with different classes of modules.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of different file formats, languages, and communication protocols and should not be restricted to the ones mentioned above. Therefore, the scope of the invention should be determined with reference to the appended claims.

What is claimed is:

1. A method comprising:
    receiving a plurality of parameters for customization of a plurality of hardware components for implementation on a programmable chip, wherein the plurality of parameters is received using an application environment configured to load an application environment manifest, wherein the application environment comprises a plurality of software components associated with a pre-patched module;
    generating a logic description including a reference to the plurality of hardware components, the plurality of hardware components including a processor core and a peripheral; and
    applying a software component specific patch to the pre-patched module to create a patched module, wherein each software component of the plurality of software components includes a patch manifest and a pre-patch manifest, the patch manifest mapping modules with patched implementations and the pre-patch manifest mapping modules with pre-patch implementations;
    using version information to determine whether a software component should use a pre-patched module by only reading a pre-patch manifest or use a patched module by reading both a pre-patch manifest and a patch manifest, the patch manifest overriding an aspect of the pre-patch manifest.

2. The method of claim 1, wherein the plurality of hardware components includes a timer a digital signal processing (DSP) core, or a HyperTransport core.

3. The method of claim 1, wherein the pre-patched module is used to generate a netlist.

4. The method of claim 1, wherein customization of the plurality of hardware components comprises paramaterization of the plurality of components.

5. The method of claim 4, wherein parameterization of the plurality of hardware components includes determining tradeoffs between speed, efficiency, and conservation of logic elements on the programmable chip.

6. The method of claim 4, wherein parameterization of hardware components includes setting a bus width, a number of registers, or a speed of a shifter.

7. The method of claim 4, wherein parameterization of hardware components includes determining processor core architecture.

8. The method of claim 1, wherein a pre-patch implementation is an original implementation.

9. The method of claim 1, wherein the pre-patched module is a symbol module operable to provide netlist information for one of the plurality of hardware components component.

10. The method of claim 1, wherein the patch manifest is read by the application environment after the pre-patch manifest is read.

11. The method of claim 10, wherein associations provided by the pre-patch manifest are overridden by associations provided in the patch manifest.

12. The method of claim 1, wherein the pre-patch manifest is associated with the application environment.

13. The method of claim 12, wherein the patch manifest is associated with a software component.

14. A system, comprising:
    memory configured to maintain an application environment configured to receive a plurality of parameters for customization of a plurality of hardware components for implementation on a programmable chip, wherein the application environment is configured to load an application environment manifest, wherein the application environment comprises a plurality of software components associated with a pre-patched module; and
    a central processing unit configured to generate a logic description including a reference to the plurality of hardware components, the plurality of hardware components including a processor core and a peripheral;
    wherein a software component specific patch is applied to the pre-patched module to create a patched module, wherein each software component of the plurality of software components includes a patch manifest and a pre-patch manifest, the patch manifest mapping modules with patched implementations and the pre-patch manifest mapping modules with pre-patch implementations, and wherein version information is used to determine whether a software component should use a pre-patched module by only reading a pre-patch manifest or use a patched module by reading both a pre-patch manifest and a patch manifest, the patch manifest overriding an aspect of the pre-patch manifest.

15. A computer readable medium having instructions stored thereon that, if executed by a computing device, cause the computing device to perform operations comprising:
    receiving a plurality of parameters for customization of a plurality of hardware components for implementation on a programmable chip, wherein the plurality of parameters are received using an application environment configured to load an application environment manifest, wherein the application environment comprises a plurality of software components associated with a pre-patched module;
    generating a logic description including a reference to the plurality of hardware components, the plurality of hardware components including a processor core and a peripheral;
    applying a software component specific patch to the pre-patched module to create a patched module, wherein each of the plurality of software components includes a patch manifest and a pre-patch manifest, the patch manifest mapping shared modules with patched implementations and the pre-patch manifest mapping shared modules with pre-patch implementations;
    using version information to determine whether a software component should use a pre-patched module by only reading a pre-patch manifest or use a patched module by reading both a pre-patch manifest and a patch manifest, the patch manifest overriding an aspect of the pre-patch manifest.

16. The computer readable medium of claim 15, wherein the plurality of hardware components includes a timer or a HyperTransport core.

17. The computer readable medium of claim 15, wherein the pre-patched module is used to generate a netlist.

18. An apparatus comprising:
    means for receiving a plurality of parameters for customization of a plurality of hardware components for implementation on a programmable chip, wherein the plurality of parameters are received using an application environment configured to load an application environment manifest, wherein the application environment comprises a plurality of software components associated with a pre-patched module;

means for generating a logic description including a reference to the plurality of hardware components, the plurality of hardware components including a processor core and a peripheral;

means for applying a software component specific patch to the pre-patched module to create a patched module, wherein each of the plurality of software components includes a patch manifest and a pre-patch manifest, the patch manifest mapping shared modules with patched implementations and the pre-patch manifest mapping shared modules with pre-patch implementations;

means for using version information to determine whether a software component should use a pre-patched module by only reading a pre-patch manifest or use a patched module by reading both a pre-patch manifest and a patch manifest, the patch manifest overriding an aspect of the pre-patch manifest.

19. The apparatus of claim 18, wherein the plurality of hardware components includes a timer or a peripheral components interface (PCI) core.

20. The apparatus of claim 18, wherein the patched module is used to generate a netlist.

* * * * *